United States Patent
Seol et al.

(12) 
(10) Patent No.: US 6,941,567 B2
(45) Date of Patent: Sep. 6, 2005

(54) VIBRATION ABSORBING APPARATUS FOR OPTICAL DISK PLAYER

(75) Inventors: Young-yun Seol, Seoul (KR); Gyoo-beom Kim, Suwon (KR); Hwan-seung Lee, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 78 days.

(21) Appl. No.: 10/456,590

(22) Filed: Jun. 9, 2003

(65) Prior Publication Data

US 2003/0235133 A1 Dec. 25, 2003

(30) Foreign Application Priority Data

Jun. 22, 2002 (KR) ........................................ 2002-35120

(51) Int. Cl.[7] ............................................. G11B 17/04
(52) U.S. Cl. ................................................... 720/624
(58) Field of Search .............................. 720/624, 621, 720/622, 625, 628, 629, 651; 360/99.02, 99.03, 99.06, 99.07

(56) References Cited

U.S. PATENT DOCUMENTS

| 4,677,607 | A | * | 6/1987 | Ejiri | 720/624 |
| 5,719,844 | A | * | 2/1998 | Abe | 720/625 |
| 6,772,426 | B2 | * | 8/2004 | Akatani | 720/624 |
| 2004/0148618 | A1 | * | 7/2004 | Tsuchiya | 720/621 |

* cited by examiner

*Primary Examiner*—Tianjie Chen
(74) *Attorney, Agent, or Firm*—Roylance, Abrams, Berdo & Goodman, L.L.P.

(57) ABSTRACT

A vibration absorbing apparatus for a disk player comprising a convey roller dispose at a disk gate between a housing and an upper chassis disposed on top of the housing and loading/unloading a disk, a hinge bracket pivotably supporting the convey roller and hinged on the upper chassis, a spring biasing the hinge bracket for the convey roller to be in close contact with the upper chassis, and a damper for absorbing vibration transferred from the hinge bracket to the housing.

18 Claims, 4 Drawing Sheets

VIBRATION ABSORBING APPARATUS FOR OPTICAL DISK PLAYER

This application claims benefit under 35 U.S.C. § 119 from Korean Patent Application No. 2002-35120, filed on Jun. 22, 2002, the entire content of which is incorporated herein by reference.

BACKGROUND OF THE INVENTION

1. Field of the Invention

The present invention relates to a disk player, and more particularly, to a vibration absorbing apparatus for an optical disk player for absorbing vibration generated when a disk player is in operation.

2. Description of the Related Art

As well known to those skilled in the art, a disk player is an apparatus for recording information on a compact disk (CD), CD-Rom, digital video disk (DVD) and DVD-Rom, and reproducing the recorded information. A typical disk player comprises an apparatus for loading a disk in the position where information can be recorded or reproduced from the disk. The disk inserted into a disk player is loaded on a turntable by a loading apparatus, and then clamped by a chucking unit and becomes turnable. While the disk is being turned, the optical pickup records information on the disk or reproduces the recorded information while moving in the radial direction of the disk.

A motor vehicle disk player, in particular, employs a disk loading apparatus capable of direct disk loading without a tray due to its spatial limitation. In addition, the motor vehicle disk player uses a loading apparatus for distinctively loading two different sized disks, for example, 80 mm and 120 mm disks.

Such motor vehicle disk player conventionally has the structure for enabling a disk to enter from the front of the housing. An upper chassis is disposed on top of the housing, and a convey roller for conveying an inserted disk is disposed inside the housing. A disk guide member is disposed on the upper chassis to correspond with the convey roller. The convey roller has a shaft and a rubber roller disposed around the shaft. The diameter of the rubber roller gradually reduces towards the middle and the rubber roller is fit around the shaft. The convey roller having such structure is rotatably disposed on the hinge bracket that is disposed on the upper chassis and becomes bi-directionally rotatable by receiving power from a predetermined driving source. The hinge bracket is pulled towards one side by a Spring to enable the convey roller to get as close as possible to the disk guiding member.

In the above structure, the disk is sucked into the housing by the operation of the convey roller when it is inserted in between the convey roller and the disk guiding member. The inserted disk is conveyed inside until it is placed on the turntable and its place is decided by a stopper. Even when the disk is stopped by the stopper, the convey roller further rotates until the disk completely arrives at its position.

However, if the convey roller continuously rotates when the disk is stopped by the stopper, slip occurs between the shaft and the rubber roller of the convey roller. In this case, vibration occurs due to the slip between the shaft and the rubber roller, and the vibration causes low noises as it is transmitted to the whole housing.

SUMMARY OF THE INVENTION

An object of the invention is to solve at least the above problems and disadvantages, and to provide at least the advantages described below.

Accordingly, one object of the present invention is to solve the foregoing problems by providing a vibration absorbing apparatus for an optical disk player for reducing the vibration occurring when the convey roller rotates.

The foregoing and other objects and advantages are realized by providing a vibration absorbing apparatus for a disk player comprising a convey roller disposed at a disk gate between a housing and an upper chassis disposed on top of the housing for loading and unloading a disk, a hinge bracket pivotably supporting the convey roller and hinged on the upper chassis, a spring biasing the hinge bracket to enable the convey roller to be in close contact with the upper chassis, and a damper for absorbing vibration transferred from the hinge bracket to the housing.

It is preferable that the damper is disposed on the hinge bracket and is a plate spring resiliently touching the housing.

Moreover, the damper comprises a plate member connected to the hinge bracket, and a resilient member resiliently protruding at one side of the plate member and touching the housing.

It is preferable that the plate member and the resilient member are integrally formed.

The convey roller comprises a shaft that is rotated by power transferred and disposed on the hinge bracket, and a rubber roller covering the shaft or at least a portion of the shaft and having a diameter gradually reducing towards a center, such that vibration occurring due to slips between the rubber roller and the shaft is absorbed by the damper.

Additional advantages, objects, and features of the invention will be set forth in part in the description which follows and, in part, will become apparent to those having ordinary skill in the art upon examination of the following, or may be learned from practicing the embodiments of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

The following detailed description will present a vibration absorbing apparatus for an optical disk player according to an embodiment of the invention in reference to the accompanying drawings.

Figure 1:
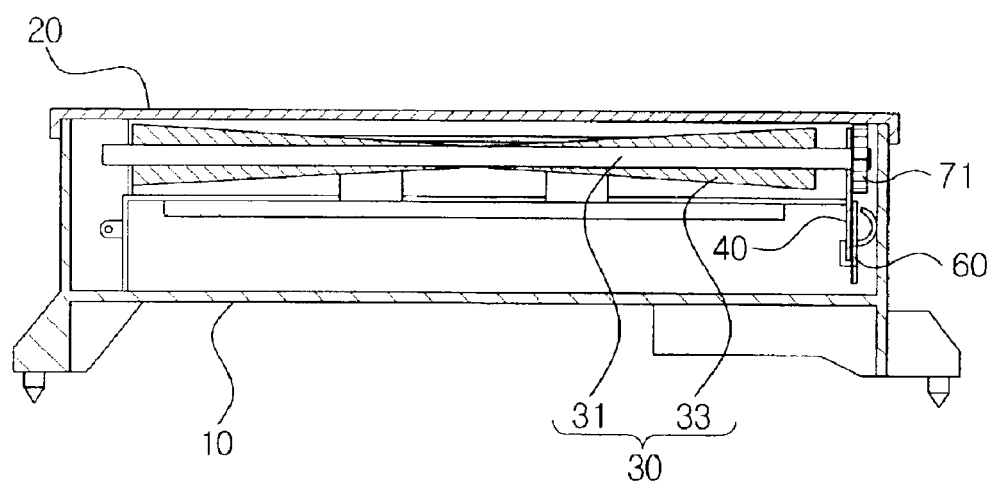
FIG. 1 is a sectional view schematically showing a vibration absorbing apparatus for an optical disk player according to an embodiment of the present invention.
Figure 2:
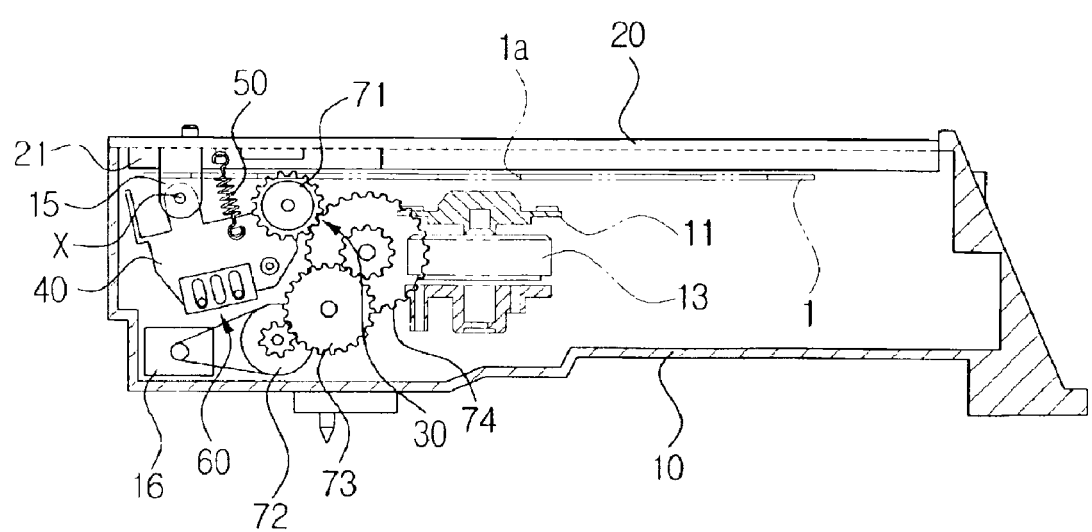
FIG. 2 is a side sectional view schematically showing a vibration absorbing apparatus for an optical disk player according to an embodiment of the present invention.

Referring to FIGS. 1 and 2, the vibration absorbing apparatus for an optical disk player according to an embodiment of the present invention comprises a housing to, an upper chassis 20 connected to the top of the housing 10, a convey roller 30 for loading and unloading a disk 1 between the housing 10 and the upper chassis 20, a hinge bracket 40 rotatably supporting the convey roller 30, a spring 50, and a damper 60.

A turntable 11 for a disk to be placed, and a spindle motor 13 for rotating the turntable, are disposed inside the housing 10. In addition, an optical pick-up (not shown) for recording or reproducing information from the disk 1 rotating on the turntable 11 is removably disposed, and a motor 16 for rotating the convey roller 300 is also disposed inside the housing 10.

The upper chassis 20 is mounted to cover the top of the housing 10, and a disk guiding unit (not shown) is disposed on the upper chassis. Underneath the upper chassis 20, a disk guiding member 21 is disposed to correspond to the convey roller 30. The guiding member 21 is horizontally formed to be overlapped with both ends of the convey roller 30. Accordingly, the disk can be conveyed while being held between the convey roller 30 and the guiding member 21.

The convey roller 30 comprises a metal shaft 31, and a rubber roller 33 covering the shaft 31 or at least a portion of the shaft 31. The rubber roller 33 rotates with the shaft 31 by the friction that occurs in between them. The shaft 31 is rotatably supported by the hinge bracket, and a driven gear 71 is disposed at one end of the shaft. The driven gear 71 is driven by the gearing of a gear train 72, 73, 74 geared with the driving motor 21.

The hinge bracket 40 is pivotably supported on the bent-up supporting member 15 formed under the upper chassis 20 towards the inside of the housing 10. When the hinge bracket 40 pivots on the hinge axis x, the shaft 31 is supported.

The spring 40 pulls the hinge bracket 40 for the convey roller 30 to be in contact with the disk guiding member 21. One end of the spring 40 is connected with the hinge bracket 40 and the other end with the upper chassis 20.

Figure 3:
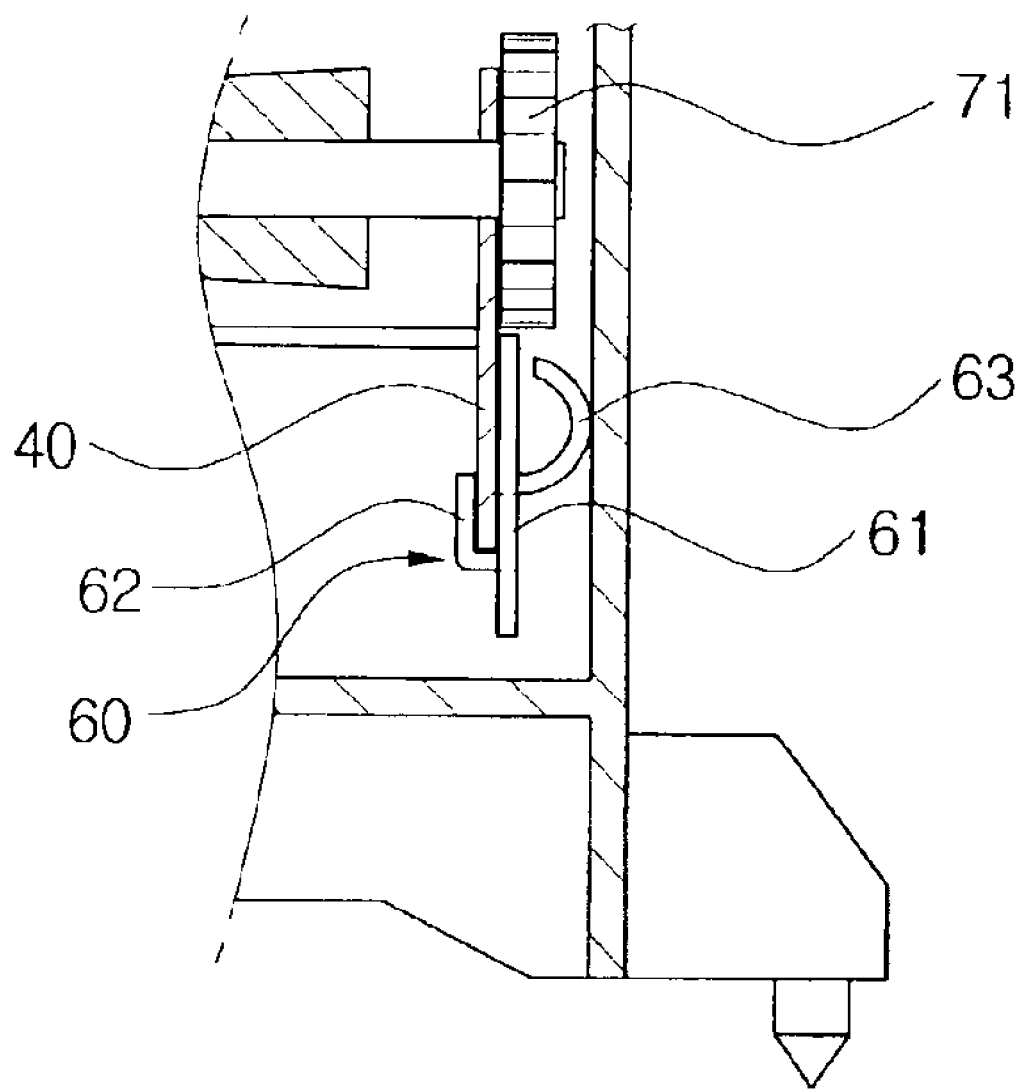
FIG. 3 is a drawing enlarged the essential parts in FIG. 1.

The damper 60 is for absorbing vibration transferred from the hinge bracket 40 to the housing 10 when the convey roller 30 rotates. It is preferable that such damper 60 is a plate spring connected to the hinge bracket 40. The damper 60 comprises a plate member 61 connected to the hinge bracket 40, a resilient member 63 resiliently protruding at one side of the plate member 61 and touching the housing 10 as shown in FIG. 3. It is preferable that the plate member 61 and the resilient member 63 are integrally formed. In other words, the resilient member 63 is formed as a part of the plate member 61 and is cut and resiliently protruded. The plate member 61 is clicked into the clamp 62 provided at one side of the hinge bracket 40.

According to the structure described above, the disk 1 is loaded inside the housing 10 to be positioned on the turntable 11 through between the convey roller 30 and the guiding member 21 as shown in FIG. 2. Although the center 1a of the disk 1 is positioned on the corresponding position of the turntable 11, the convey roller 30 continues to rotate. Therefore, slips may occur between the rubber roller 33 and the shaft 31 of the convey roller 30. Due to the slips, vibration occurs and the vibration is transferred to the hinge bracket 40. The damper 60 disposed on the hinge bracket 40 acts for reducing the vibration transferred to the hinge bracket 40. In particular, as most of the vibration transferred from the hinge bracket 40 to the hosing 10 is absorbed in the resilient member 63, low noises through the housing 10 can be prevented. Moreover, slips may occur between the shaft 31 and the rubber roller 33 of the convey roller 30 when the disk is unloaded, and the vibration occurring by that operation can also be effectively absorbed through the damper 60.

In accordance with the vibration absorbing apparatus for an optical disk player according to the embodiments of the present invention described above, vibration occurring when the convey roller rotates can be effectively prevented from being transferred to the housing through the damper provided on the hinge bracket.

As a result, credibility and high quality of the product can be maintained.

Figure 4:
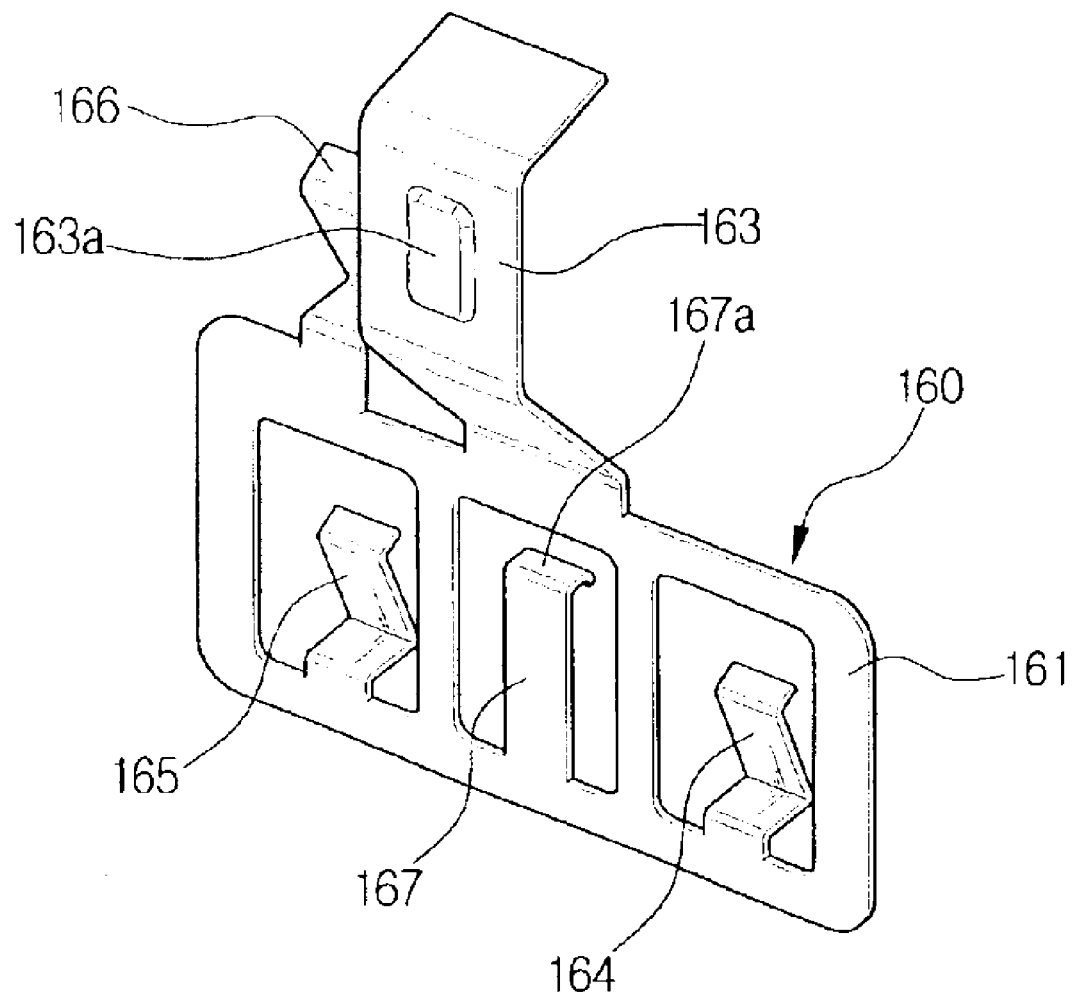
FIG. 4 is a perspective view of an example of a damper of a vibration absorbing apparatus for an optical disk player according to another embodiment of the present invention.

FIG. 4 illustrates a damper 160 according to another embodiment of the present invention.

The damper 160 includes a plate portion 161, a resilient portion 163 bent and extended from an end of the plate portion 161, a plurality of resilient supporting portions 164, 165 and 166, and a separation preventing portion 167.

Figure 5:
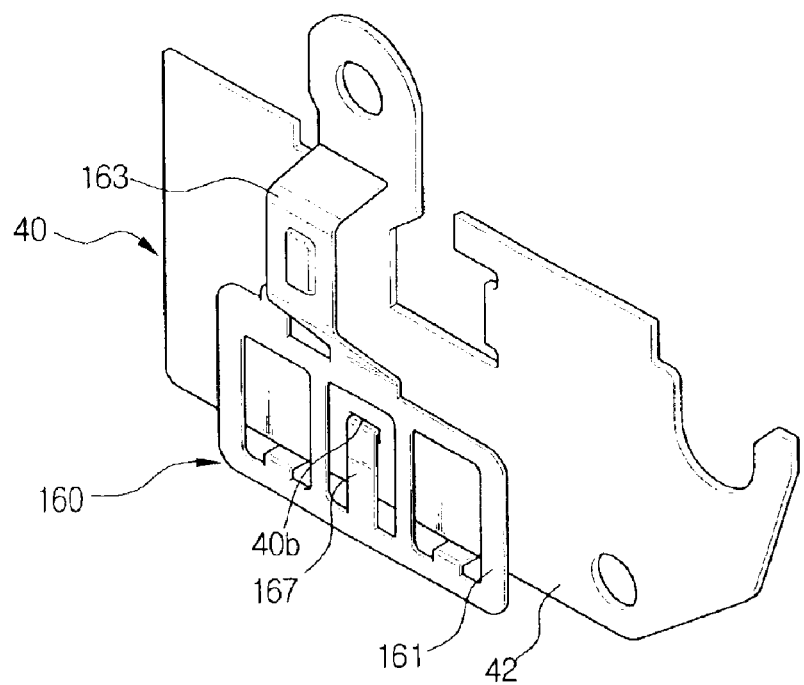
FIGS. 5 and 6 are perspective views illustrating the damper of FIG. 4 being connected with a hinge bracket.
Figure 6:
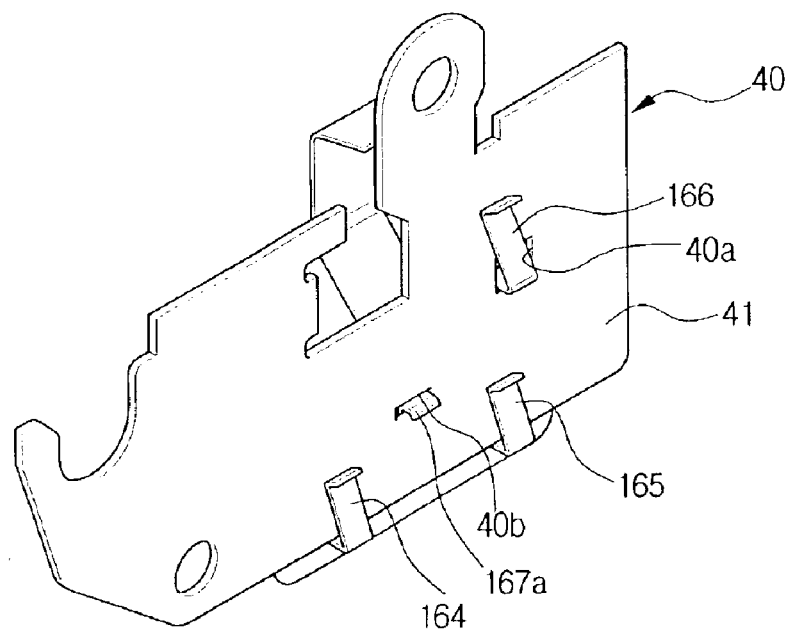

The resilient portion 163 integrally extends from the plate portion 161 far enough to resiliently contact the housing 10. A protrusion 163a is formed at an end of the resilient portion 163 for contacting the housing 10. The resilient supporting portions 164 and 165 are formed by partially cutting away the plate portion 161 and then bending the remaining part of the plate portion 161 in a predetermined pattern. As shown in FIGS. 5 and 6, the resilient supporting portions 164 and 165 make contact with the inner surface 41 of the hinge bracket 40, thus clamping the hinge bracket 40 to the plate portion 161. The resilient supporting portion 166 has the same or substantially the same shape as that of other resilient supporting portions 164 and 165. The resilient supporting portion 166 is bent and extends from the upper end of the plate portion 161. The resilient supporting portion 166 is passed through a passing hole 40a formed in the hinge bracket 40 and resiliently clamps the hinge bracket 40.

The separation preventing portion 167 is provided between the resilient supporting portions 164 and 165, and is formed by partially cutting away the plate portion 161. An end of the separation preventing portion 167 is bent to form a hooking portion 167a which is engaged in a hooking hole 40b of the hinge bracket 40. The hooking portion 167a is engaged in the hooking hole 40b so that the separation preventing portion 167 and plate portion 161 are in contact with an outer surface 42 of the hinge bracket 40. The hooking portion 167a thus prevents the damper 160 from being separated from the hinge bracket 40. The contact of the hinge bracket 40 and the damper 160 is reinforced by the support of the resilient supporting portions 164, 165 and 166, and thus eliminates the possibility of having loose engagement, or shaking of the hinge bracket 40 or of the damper 160. As a result, vibration of the hinge bracket 40 is efficiently absorbed through the damper 160.

While the invention has been shown and described with reference to certain preferred embodiments thereof, it will be understood by those skilled in the art that various changes in form and details may be made therein without departing from the spirit and scope of the invention as defined by the appended claims.

Furthermore, the foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A vibration absorbing apparatus, adapted for use with a disk player, the vibration absorbing apparatus comprising:
   a convey roller disposed at a disk gate between a housing and an upper chassis disposed on top of the housing for loading and unloading a disk;
   a hinge bracket, adapted to pivotably support the convey roller and hinged on the upper chassis;
   a spring, adapted to bias the hinge bracket to enable the convey roller to be in close contact with the upper chassis; and
   a damper, adapted to absorb vibration transferred from the hinge bracket to the housing.

2. A vibration absorbing apparatus as claimed in claim 1, wherein:
   said damper is disposed on the hinge bracket.

3. A vibration absorbing apparatus as claimed in claim 2, wherein:
   said damper includes a plate spring resiliently touching the housing.

4. A vibration absorbing apparatus as claimed in claim 1, wherein:
   said damper includes a plate spring resiliently touching the housing.

5. A vibration absorbing apparatus as claimed in claim 1, wherein:
   said damper comprises a plate member coupled to the hinge bracket, and a resilient member resiliently protruding at one side of the plate member and touching the housing.

6. A vibration absorbing apparatus as claimed in claim 5, wherein:
   said plate member and said resilient member are integral with each other.

7. A vibration absorbing apparatus as claimed in claim 1, wherein:
   said convey roller comprises a shaft that is adapted to be rotated by power transferred and disposed on said hinge bracket.

8. A vibration absorbing apparatus as claimed in claim 7, wherein:
   said convey roller further comprises a rubber roller covering at least a portion of said shaft and having a diameter gradually reducing towards a center of a length of said shaft, such that said damper absorbs vibration occurring due to slips between said rubber roller and said shaft.

9. A vibration absorbing apparatus as claimed in claim 1, wherein:
   said damper comprises a plate portion and a resilient portion, bent and extending from an end of the plate portion far enough to resiliently contact the housing.

10. A vibration absorbing apparatus as claimed in claim 9, wherein:
    an end of said resilient portion includes a protrusion formed thereon for contacting the housing.

11. A vibration absorbing apparatus as claimed in claim 9, wherein:
    said damper further comprises a plurality of resilient supporting portions for contacting an inner surface of the hinge bracket to clamp the hinge bracket to the plate portion.

12. A vibration absorbing apparatus as claimed in claim 11, wherein:
    the resilient supporting portions have substantially the same shape.

13. A vibration absorbing apparatus as claimed in claim 11, wherein:
    the resilient supporting portions are formed by partially cutting away the plate portion to form remaining portions, and then bending the remaining portions in respective predetermined patterns as the resilient supporting portions.

14. A vibration absorbing apparatus as claimed in claim 11, wherein:
    one of the resilient supporting portions is bent and extends from the upper end of the plate portion, and passes through a passing hole formed in the hinge bracket and resiliently clamps the hinge bracket to the plate portion.

15. A vibration absorbing apparatus as claimed in claim 9, wherein:
    said damper further comprises a separation preventing portion, an end of the separation preventing portion being bent to form a hooking portion which is engaged in a hooking hole of the hinge bracket with the separation preventing portion and plate portion being in contact with an outer surface of the hinge bracket.

16. A vibration absorbing apparatus as claimed in claim 15, wherein:
    said damper further comprises a plurality of resilient supporting portions for contacting an inner surface of the hinge bracket to clamp the hinge bracket to the plate portion, and the separation prevention portion is disposed between two of the resilient supporting portions.

17. A vibration absorbing apparatus as claimed in claim 15, wherein:
    the separation preventing portion is formed by partially cutting away the plate portion to form a remaining portion as the separation preventing portion.

18. A vibration absorbing apparatus as claimed in claim 15, wherein:
    the hooking portion prevents said damper from being separated from the hinge bracket.

* * * * *